July 22, 1941. H. FROMM 2,249,817
FRUIT JUICE EXTRACTOR
Filed March 20, 1937 2 Sheets-Sheet 1
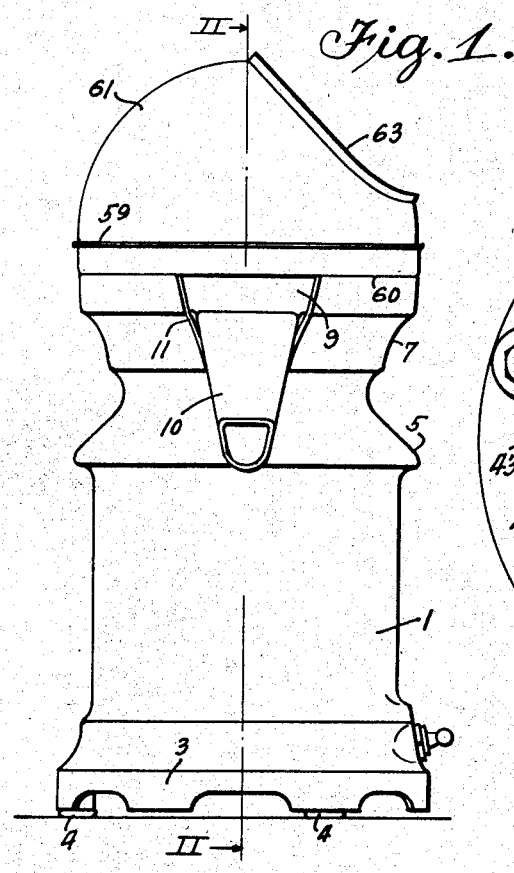
INVENTOR.
Herbert Fromm
BY
Lyon & Lyon
ATTORNEYS

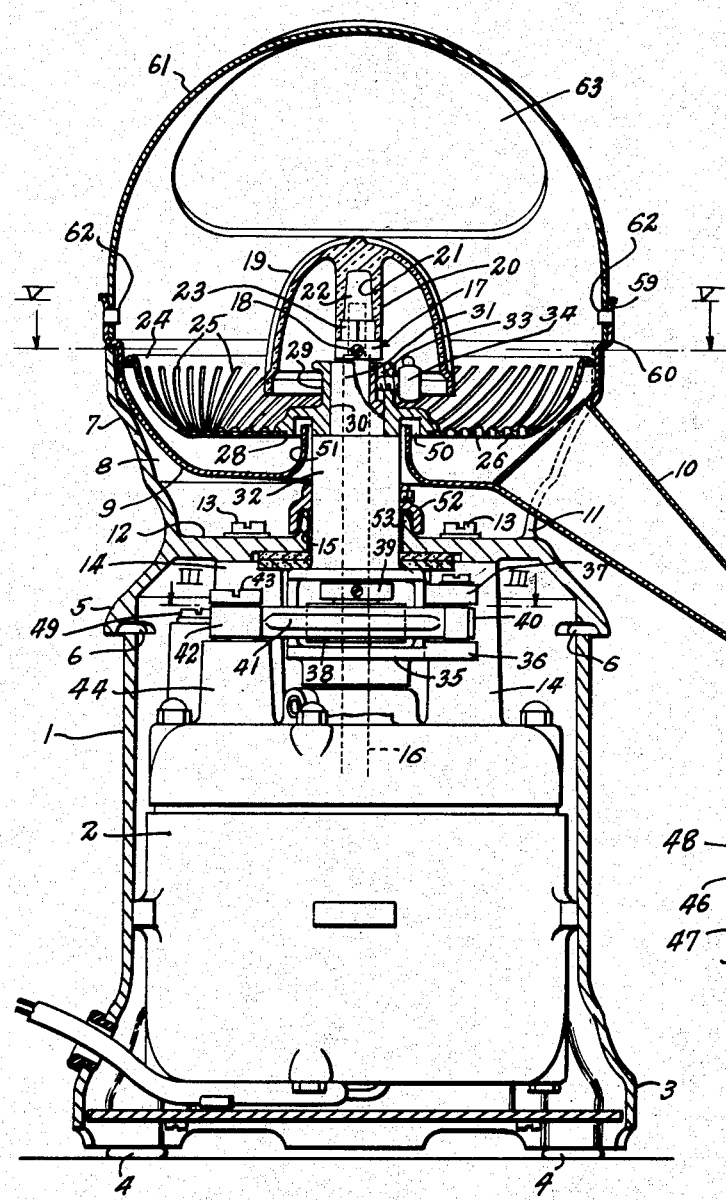
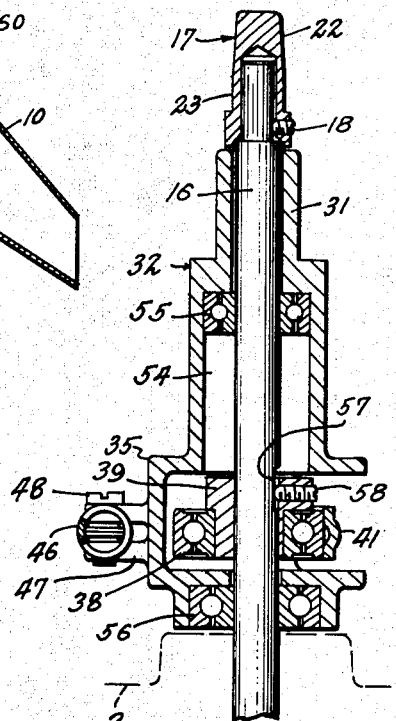

Patented July 22, 1941

2,249,817

UNITED STATES PATENT OFFICE 2,249,817

FRUIT JUICE EXTRACTOR

Herbert Fromm, Hamburg, Wis.

Application March 20, 1937, Serial No. 132,117

5 Claims. (Cl. 146—3)

My invention relates to fruit juice extractors and has particular reference to a machine for extracting and separating fruit juices from pulp and peel, particularly of citrus fruits.

In fruit juice extractors it is common practice to employ a power driven reamer adapted to ream half oranges and other citrus fruits by rotary motion of the reamer against the cut section of the half fruit. Such reamers tear the membranes of the fruit and disrupt the juice sacs, liberating the juice therefrom but at the same time the torn membranes and some portion of the albido are extracted and fall with the juice, requiring that the extracted juice be strained from the debris before it can be used. Also the reamers frequently tear out whole juice sacs without disrupting the same and such juice sacs will not pass through the strainer, causing considerable loss of juice from the fruit.

It is therefore an object of my invention to provide a juice extractor of the reamer type in which a strainer is disposed immediately below the reamer for the purpose of catching the juice, pulp, membranes and albido portions and in which the strainer is so constructed and operated as to tend to tear any disrupted juice sacs, further liberating the juice from the debris.

Another object of my invention is to provide a fruit juice extractor of the character set forth in the preceding paragraph wherein the strainer is mounted upon the machine for oscillatory movement, producing a shaking or jarring of the contents of the strainer to further assist in the separation of the juice from the debris.

Another object of my invention is to provide a fruit juice extractor of the character set forth wherein a single operating shaft is employed to rotate the reamer and to impart an oscillatory motion to the strainer.

Other objects and advantages of my invention will be apparent from a study of the following specifications, read in connection with the accompanying drawings, wherein Fig. 1 is a vertical elevational view of a fruit extractor constructed in accordance with my invention;

Fig. 2 is a vertical sectional view taken along line II—II of Fig. 1;

Fig. 3 is a horizontal sectional view taken along line III—III of Fig. 2;

Fig. 4 is a detail sectional view through the power shaft and oscillating mechanism taken along line IV—IV of Fig. 3;

Fig. 5 is a detail plan view of the strainer which may be employed in the practice of my invention;

Fig. 6 is a detail fragmentary view of a portion of the strainer illustrated in Fig. 5, showing one of the strainer openings and the projections thereon; and Fig. 7 is a detail fragmentary sectional view of a portion of the strainer taken along line VII—VII of Fig. 6.

Referring to the drawings, I have illustrated a fruit juice extractor as comprising a suitable casing 1 which is preferably hollow and is adapted to constitute a housing for a motor 2 by which the mechanism of the extractor is operated. The housing 1 is preferably provided with a base portion 3 adapted to rest upon a table or other suitable surface and preferably having foot pieces 4 attached thereto.

By referring particularly to Fig. 2, it will be observed that the upper portion of the casing 1 is provided with an overhanging annular flange portion 5 which provides a lip beneath which may be formed a plurality of ventilation openings 6 by which air may enter or leave the casing to assist in the cooling of the motor 2. The extreme upper end of the casing 1 flares outwardly as indicated at 7 to form a bowl-receiving chamber 8 in which seats a bowl 9 of metal or other suitable material adapted to receive the juices extracted and to pass them out of the machine through a spout 10 extending through a suitable opening 11 in the flared upper end of the casing 1. Immediately below the flared upper end 7 of the casing is a partition 12 which may be formed integrally with the casing 1 and which constitutes a mounting plate by which the motor 2 may be rigidly secured within the casing as by means of screws 13 passing through the mounting plate or partition 12 and into suitable upstanding bosses 14 on the motor.

The mounting plate 12 is provided with a central bore 15 through which extends the motor shaft 16, the upper end of which is provided with a tip 17, either formed integrally with the motor shaft 16 or attached thereto as by screw or pin 18, which constitutes the clutch supporting the reamer 19 and connects the reamer 19 for rotation with the motor shaft 16. The reamer 19 may be of any suitable construction, either metal or vitreous material such as are ordinarily used in machines of this character and is preferably constructed as a dome-like member having a central downwardly depending boss 20 provided with an interior bore 21 of such shape as to conform with the tip or clutch portion 17 of the motor shaft 16. As illustrated herein, the tip or clutch portion 17 of the motor shaft 16 is formed with its upper end in the shape of a frustrated cone as indicated at 22, while the lower portion is squared as indicated at 23 to be received in a squared portion of the bore 21 in the reamer 19, the frustrated cone section acting as a guide when the reamer is dropped upon the tip 17 while the squared portion acts as a rigid clutch mechanism by which rotary force is transmitted from the shaft 17 to the reamer. By reason of this construction the reamer may be dropped upon the motor shaft while the motor is running and will be guided into its proper seating relation upon the tip 17 without injury either to the clutch or squared portion 23 or the interior of the bore 21. It will be noted that the reamer is not permanently attached to the motor shaft but is removable to facilitate cleaning of the machine and the reamer.

Immediately below the reamer 19 is mounted a strainer 24, preferably of relatively shallow dish-shape and preferably formed of metal having a plurality of openings 25 and 26 distributed throughout the surface of the strainer. The openings 25 are preferably curvilinear cuts made through the material of the strainer and preferably extend from a point adjacent the periphery of the strainer to a point approximate the lowermost level of the dish-shaped strainer. The openings 26 are preferably substantially circular in shape and extend vertically through the material of the strainer, such openings being formed in any suitable manner as by stamping, in such manner as to produce a shape such as that shown in Figs. 6 and 7 wherein the material at one side of the opening 26 is struck upwardly as indicated at 27 to form an upwardly extending projection against which juice sacs and debris will impact when the strainer is oscillated as hereinafter described.

The strainer 24 is provided with a central opening 28 which may be formed by cutting out the metal at the center of the strainer and permitting the attachment of a hub 29 thereto or the hub 29 may be formed integrally with the strainer 24 if desired. The hub 29 extends upwardly and has a central bore 30 adapted to receive and engage the squared upper end 31 of a bushing 32 which is adapted to surround the motor shaft 16 but which is free of the shaft to permit relative rotation therebetween. In order to hold the strainer rigidly secured to the bushing 32, I prefer to provide a key slot 33 extending from the upper end of the bushing to a considerable distance down along the bushing and adapted to receive a set screw or clamping screw 34 extending through the hub 29 and adapted to be manipulated to clamp the strainer 24 rigidly to the bushing 32.

Oscillatory motion is imported to the strainer 24 through the bushing 32, as is best illustrated in Figs. 2, 3, and 4. This mechanism comprises an enlarged lower section 35 of the bushing 32 having a pair of outwardly or radially extending ears 36 and 37 thereon. The enlargement 35 of the bushing 32 adapts the same for the reception of a roller or ball bearing 38 mounted upon an eccentric 39 rigidly secured to the motor shaft 16 so that the rotation of the shaft 16 will cause the eccentric 39 to impart a reciprocatory motion or an eccentric motion to the outer surface of the roller bearing 38. The ears 36 and 37 are spaced one above the other as indicated in Fig. 2 providing a space therebetween for the reception of a hook-like end 40 of a lever 41, the opposite end of which is pivoted as at 42 upon a screw 43 received in a boss 44 on the motor frame, a bushing 45 being interposed between the screw 43 and the lever 41 if desired for the purpose of reducing friction therebetween. The lever 32 extends across the path of movement of the roller bearing 38 so that as the roller bearing moves in its reciprocatory or eccentric path the outer hooked end (of the lever) 40 of the lever 41 will be moved through an oscillatory path and will cause the bushing 32 to be moved through an oscillatory path, the degree of which will depend upon the shape of the eccentric 39.

By referring particularly to Fig. 3, it will be noted that the lever 41 swings the bushing 32 in a clockwise direction and in order to cause the bushing to be retracted in the counterclockwise direction, I prefer to provide a relatively heavy spring 46, one end of which is secured to an outstanding ear 47 on the bushing 32 as indicated at 48, while the opposite end of the spring 46 is secured as by means of a pin or screw 49 to the frame of the motor 2.

It will be noted that the clockwise movement of the strainer will move the projections 27 of the openings 26 against the juice sacs or debris which is in the strainer, while in the reverse movement of the strainer the debris will be forced rearwardly against the projections when the strainer comes to rest in its rearward or counterclockwise motion as the lever 41 again contacts the bearing 38.

It will be observed from Fig. 2 that the hub 29 of the strainer is provided with a channel 50 into which projects an upwardly extending flange 51 formed upon the lower portion of the bowl 9, thus effectively avoiding the leakage of juice from the bowl to the bushing 32 and to the motor 2 located below it. Also if desired a cup-like bushing 52 may be provided upon the bushing 32 to extend about an upstanding flange 53 formed upon the motor-supporting plate or partition 12 to thus further prevent leakage of the juices into the motor and the oscillating mechanism mounted above it.

The bushing 32 may be loosely mounted upon the motor shaft 16 though I prefer to support the same in ball bearings, as indicated in Fig. 4, wherein the bushing is illustrated as having a relatively large central bore 54, near the upper end of which is seated a ball bearing 55 engaging the interior of the bushing 32 and the exterior of the motor shaft 16 while the enlarged lower end 35 of the bushing 32 is likewise provided with a ball bearing 56 engaging the shaft 16 and the bushing 32.

Also it will be noted from Fig. 4 that the eccentric 39 is keyed or otherwise fixed to the shaft 16 as by a keyway 57 on the shaft 16 into which projects a set screw 58.

It will also be noted that the upper end of the bowl 9 may be formed with an upstanding flange 59 adapted to form a seat 60 into which the lower edge of a substantially semi-spherical hood 61 may rest, the hood 61 being secured to the bowl 9 by means of a bayonet and slot joint indicated at 62. The hood 61, of course, will be provided with an opening 63 through which access to the reamer may be had.

With the machine assembled as hereinbefore described, the operator of the machine may place a half orange or other fruit through the opening 63 of the hood 61 and press it upon the reamer 19. The motor 2 operating at a relatively high speed will rotate the reamer 19, causing the reamer to extract or tear the membranes and juice sacs from the interior of the peel, the juice and debris falling into the strainer 24. Rotation of the motor shaft 16 as hereinbefore described imparts an oscillatory movement to the strainer 24 which, as the debris and juice falls upon it, will quickly and completely separate the juice from the debris, the debris being held in the strainer while the juice falls through the openings 25 and 26 to the interior of the bowl 9, from whence it passes out through the spout 10 into a suitable receptacle placed in front of the extractor.

While I have shown and described the preferred embodiment of my invention, I do not desire to be limited to any of the details of construction shown or described herein, except as defined in the appended claims.

I claim:

1. In a fruit juice extractor, a shaft rotatable about a vertical axis, a reamer disposed upon the upper end of said shaft, a strainer disposed below said reamer, means mounting said strainer for oscillatory movement about an axis concentric with the rotation of said shaft, an eccentric on said shaft, a spring urging said strainer in one direction relative to said shaft and a lever engaging said strainer and said eccentric for moving said strainer in the opposite direction upon each rotation of said shaft.

2. In a fruit juice extractor, a motor, means mounting said motor with the shaft thereof extending vertically, a reamer secured upon the upper end of said shaft, a strainer disposed below said reamer, means mounting said strainer relative to said shaft for oscillatory movement relative thereto, an eccentric on said shaft, a boss extending from said motor in a direction parallel to said shaft and in spaced relation thereto, a lever having one of its ends pivoted to said boss and the other of its ends engaged with said strainer-mounting means, said lever being disposed relative to said shaft to be engaged by said eccentric whereby rotation of said shaft will move said lever to oscillate said strainer.

3. In a fruit juice extractor, a motor, means mounting said motor with the shaft thereof extending vertically, a reamer secured upon the upper end of said shaft, a strainer disposed below said reamer, means mounting said strainer relative to said shaft for oscillatory movement relative thereto, an eccentric on said shaft, a boss extending from said motor in a direction parallel to said shaft and in spaced relation thereto, a lever having one of its ends pivoted to said boss and the other of its ends engaged with said strainer-mounting means, said lever being disposed relative to said shaft to be engaged by said eccentric whereby rotation of said shaft will move said lever to oscillate said strainer, a second boss on said motor extending parallel with said shaft, and a spring interconnecting said last named boss and said strainer mounting means to normally urge said strainer in one direction.

4. In a fruit juice extracting and straining appliance in combination, a motor mounted at a relatively low level in said appliance, a rotary juice extractor spaced above said motor, a motor driven shaft extending from the motor upwardly to said extractor for rotating the latter in a constant direction, an oscillatory juice strainer supported for operation below said extractor, an actuator carried by said shaft between said motor and said strainer, and a power transmitting device mounted to reciprocate in a plane transverse the axis of said shaft intermediate the ends of said shaft and constructed and arranged to convert rotary movement of said actuator into oscillatory movement of said strainer.

5. In a fruit juice extractor, a shaft rotatable about a vertical axis, a reamer secured upon the upper end of such shaft, a strainer disposed below the reamer and secured to a bushing, means mounting the bushing on the shaft for rotation relative thereto, an eccentric carried by said shaft, a lever pivotally constrained at one end by a fixed pivot and disposed to contact the periphery of the eccentric, connecting means for transmitting motion from the free end of the lever to an outer portion of the bushing, whereby rotation of the eccentric with the shaft periodically causes partial rotation of the strainer, and means to return the bushing to the position it had prior to said partial rotation, the returning means being effective only as the eccentric is moved away from its most extended position toward the lever.

HERBERT FROMM.